United States Patent
Gulistan

[15] 3,639,971
[45] Feb. 8, 1972

[54] METHOD OF PRODUCING A CAPTIVE JACKING SCREW

[72] Inventor: Bulent Gulistan, Malibu, Calif.
[73] Assignee: Deutsch Fastener Corp., Los Angeles, Calif.
[22] Filed: Jan. 2, 1970
[21] Appl. No.: 163

Related U.S. Application Data

[62] Division of Ser. No. 710,294, Mar. 4, 1968, Pat. No. 3,502,130.

[52] U.S. Cl. .................................29/437, 29/512, 29/523, 10/10
[51] Int. Cl. ..........................................B23p 11/00
[58] Field of Search ................29/437, 509, 512, 523; 10/10; 151/69

[56] References Cited

UNITED STATES PATENTS

| | | | |
|---|---|---|---|
| 1,251,676 | 1/1918 | McCaffray | 151/69 UX |
| 3,138,188 | 6/1964 | Tuozzo et al. | 151/69 |
| 3,204,680 | 7/1965 | Barry | 151/69 |
| 3,244,212 | 4/1966 | Barry | 151/69 |
| 3,250,559 | 5/1966 | Sommerfeld | 151/69 X |
| 3,343,581 | 9/1967 | Martin et al. | 151/69 |

*Primary Examiner*—Charlie T. Moon
*Attorney*—Gausewitz & Carr

[57] ABSTRACT

The method of providing a fastener for separating associated parts when the fastener is loosened in which the unthreaded shank of a screw blank is extended through a collar having an outwardly extending flange at one end and a thin-walled portion at the other end adapted to be bent outwardly in securing the collar to a workpiece, the collar also having an internal shoulder, after which a retainer ring is placed on the shank and is engageable with the internal shoulder, and threads are rolled on the end of the shank to hold the retainer ring on the shank.

3 Claims, 3 Drawing Figures

PATENTED FEB 8 1972

3,639,971

INVENTOR
BULENT GULISTAN

BY
Jemewitz & Carr
ATTORNEYS

3,639,971

METHOD OF PRODUCING A CAPTIVE JACKING SCREW

REFERENCE TO PARENT APPLICATION

This is a division of my copending patent application Ser. No. 710,294, filed Mar. 4, 1968, now U.S. Pat. No. 3,502,130 for Captive Jacking Screw.

BACKGROUND OF THE INVENTION

1. The Field of the Invention

This invention relates to a method for producing a fastener.

2. The Prior Art

It has been known in the past that fasteners, such as screws, may be retained to a workpiece and held in such a manner that when the fastener is loosened the workpiece will become separated from an adjoining part. An example is found in U.S. Pat. No. 1,491,394, although the objective of that invention was to capture the screw rather than to separate the parts upon loosening of the fastener. Such prior devices require the shank of the screw to be extended through the workpiece, following which a retainer device is applied. Normally this is done in the field at the time the fastener is to be utilized. In such designs, a U-shaped member serves as the retainer, fitting in a groove in the shank of the screw, after which it is necessary to pinch the ends of the retainer together to prevent the retainer from being lost from the screw. Thus, there has been some difficulty in installation of fasteners of this type because of the operations which must be performed when the fastener is applied to the workpiece. Particularly serious is the lack of complete assurance that the fastener will be retained to the workpiece and not separated during service conditions. The application of a retaining ring to the fastener in the field raises the danger that the fastener may not be held properly and will become lost at a future time. Such retainers are not protected and easily may become knocked loose from the screw during use and handling.

SUMMARY OF THE INVENTION

Accordingly to the present invention, a fastener is provided which is both securely held to the workpiece and which will function to separate the workpiece from the associated part when the fastener is loosened. The installation is simplified without the danger of an improper attachment. This is accomplished by a design in which the shank of the fastener extends through an opening in a collar to which it is held by a retaining ring.

The retaining ring is continuous, and is slid onto the screw shank before the shank is threaded. Threads then are rolled on the shank, increasing its diameter at that location so that the retainer ring cannot escape from the shank.

The collar has a shoulder adapted to engage one side of the workpiece and a cylindrical portion that extends through an opening in the workpiece. The outer end of the collar has a relatively thin wall permitting it to be bent outwardly to form a flange that overlaps the surface of the workpiece. This flange cooperates with the shoulder to hold the collar to the workpiece. Thus, the screw is held to the collar and the collar, in turn, is secured to the workpiece. The outward bending of the flange to hold the collar to the workpiece is accomplished very easily and without danger of the collar's later becoming loosened during service. The end of the shank extends beyond the collar and is adapted to engage the threaded opening of an adjacent workpiece.

When the fastener is in use and the screw is loosened, the threads push on the retainer ring as the screw shank is moved axially. The retainer ring thereby is caused to bear against the collar, which, in turn, moves the part with which it is associated to separate that part from the other to which attachment had been made.

DESCRIPTION OF THE PREFERRED EMBODIMENT

Figure 1:
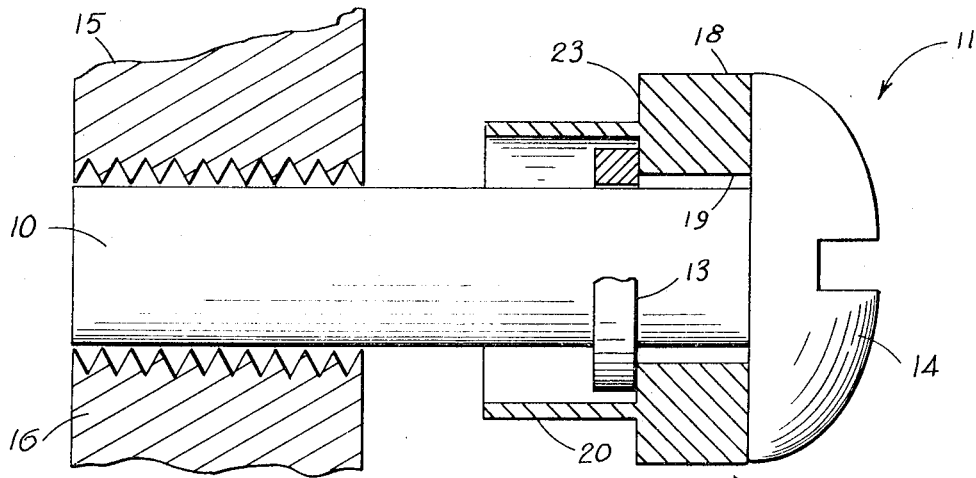
FIG. 1 is a longitudinal sectional view of the fastener during manufacture, preparatory to forming rolled threads on the screw blank.

The shank 10 of a screw blank 11 is extended through a collar 12 prior to the formation of threads on the shank, as indicated in FIG. 1. After this, a retaining ring 13 is slid over the shank 10. The retainer ring is continuous and has an inside diameter approximating that of the shank 10.

Then, with the shank 10 projecting beyond one end of the collar 12, and with the head 14 of the screw blank 11 in adjacency with the other end of the collar, threads are rolled on the distal end of the shank 10. This is accomplished by thread-rolling dies 15 and 16, which are brought into engagement with the shank 10 beyond the end of the collar 12. This produces the rolled threads 17 on the end of the shank seen in FIG. 2. When the threads are rolled in this manner, they are given a major diameter greater than the diameter of the shank 10 prior to the time the threads were formed. This major diameter is greater than the remaining unthreaded portion of the shank and larger than the inside diameter of the retainer ring 13. Consequently, the retainer ring 13 cannot escape from the screw shank, nor can the screw become separated from the collar 12.

Figure 2:
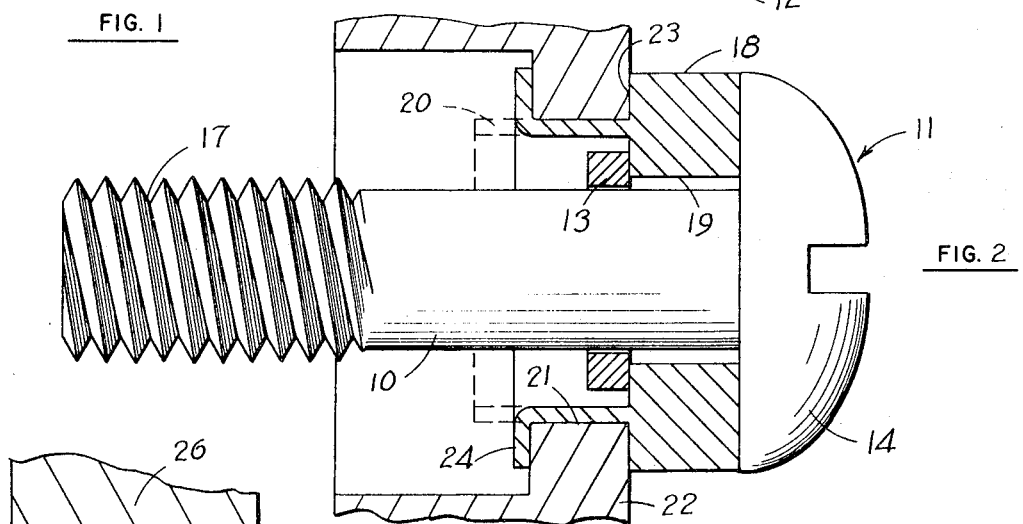
FIG. 2 is a sectional view of the fastener of FIG. 1 after completion and as attached to a part.

In use of the fastener, the collar is attached to the workpiece in the manner shown in FIG. 2. The collar 12 is a continuous tubular member which at the end adjacent the screw head 14 has a relatively thick wall provided by an enlarged outer surface 18 and a smaller bore 19 that slidably receives the screw shank 10. At the opposite end portion, the outside diameter is reduced and the inside diameter is increased to provide a thin-walled section 20 that is inserted through the opening 21 in the workpiece 22. The exterior abutment 23 of the collar, between the portions 18 and 20, is brought into engagement with the surface of the workpiece 22 at one end of the opening 21. The collar beyond the abutment 23 is longer than the opening 21 so that the end of the collar projects beyond the opposite end of the opening. The outer end of the thin-walled portion 20 then is bent outwardly to form a flange 24 overlapping the surface of the part 22 at the opposite end of the opening 21. The abutment 23 and flange 24 cooperate to retain the collar 12 to the workpiece 22.

Figure 3:
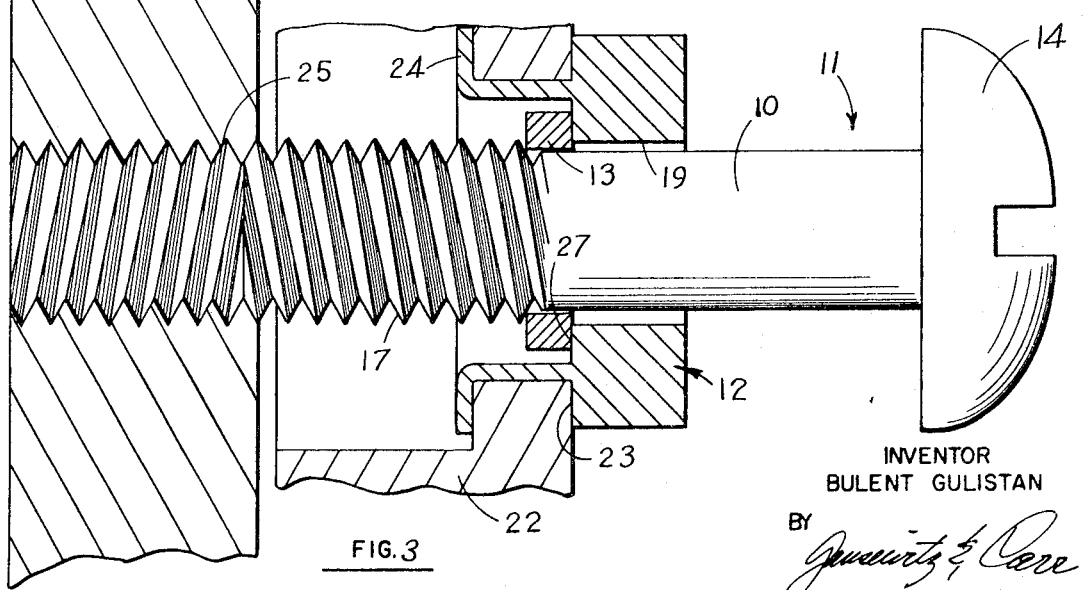
FIG. 3 is a sectional view of the fastener of FIGS. 1 and 2 as it is being loosened and causes the parts to become separated.

When the screw 11 is loosened from the opening 25 in the mating part 26, the screw shank 10 is caused to move axially outwardly away from the part 26 (see FIG. 3). This axial movement ultimately brings the inner end of the threads 17 into engagement with the retainer ring 13 within the thin-walled portion 20 of the collar that receives it. The threads cannot pass through the retainer ring 13, and so press the retainer ring 13 outwardly against the internal radial wall 27 between the thin-walled portion 20 and the bore 19. Therefore, the retainer ring 13 is caused to push outwardly on the collar 12 at the abutment formed by the wall 27, so that the collar, in turn, moves the part 22 away from the part 26. Therefore, there is in automatic separation of the parts when the fastener is loosened.

This arrangement has the advantage of a simple construction in which the retainer ring can never be dislodged from the screw.

The foregoing detailed description is to be clearly understood as given by way of illustration and example only, the spirit and scope of this invention being limited solely by the appended claims.

I claim:

1. The method of providing a fastener capable of causing separation of parts comprising the steps of
   providing a screw blank having an unthreaded shank and a head,
   extending said shank through a collar,
   said collar being provided at one end with a relatively thin wall for permitting said collar at said one end to be bent outwardly to form a flange for use in securing said collar to a part, an external shoulder inwardly of said one end, and an internal shoulder inwardly of said one end, then positioning a continuous annular member of greater outside diameter than said internal shoulder around said shank in a sliding relationship therewith inwardly of the distal end portion of said shank, and then forming threads on said distal end portion of said shank to a greater major diameter than the inside diameter of said annular member.

2. The method of providing a fastener on a part such that when said fastener is loosened said part will be separated from a mating workpiece comprising the steps of providing a collar having a bore therethrough, an internal abutment in said bore inwardly of and facing one end of said collar, an external abutment on the exterior of said collar, and a relatively thin wall at said one end, inserting through said collar the unthreaded shank of a screw blank so as to bring the head of said screw blank into adjacency with the opposite end of said collar, then slidably fitting over said shank inwardly of the distal end portion of said shank a continuous annular member of greater outside diameter than the diameter of said internal abutment, and of smaller outside diameter than the internal diameter of said collar between said internal abutment and said one end, then rolling screw threads on said distal end portion of said shank to a major diameter greater than the inside diameter of said annular member, then inserting said collar through an opening in a workpiece so as to bring said external abutment of said collar into engagement with a surface of said workpiece at one end of said opening, and then bending said relatively thin-walled portion of said collar outwardly over a surface of said workpiece at the opposite end of said opening to provide a flange cooperating with said external abutment to hold said collar to said workpiece, whereby upon loosening of said threads on said shank from a mating part said threads bear against said annular member and cause said annular member to bear against said internal abutment for shifting said workpiece away from said mating part.

3. The method of providing a fastener on a part such that when said fastener is loosened said part will be separated from a mating workpiece comprising the steps of providing a collar having a first bore portion of a relatively small diameter adjacent one end, a second bore portion of a relatively larger diameter adjacent the opposite end so that said collar at said opposite end has a relatively thin wall, and a first abutment intermediate said first and second portions of said bore, providing said collar with an additional exterior abutment, providing a screw blank with a head and an unthreaded shank longer than said collar, inserting said unthreaded shank through said collar so as to bring said head of said screw blank into adjacency with said one end of said collar, and to provide a distal end portion of said shank projecting beyond said opposite end of said collar, then slidably fitting over said shank inwardly of said distal end portion thereof a continuous annular member of larger outside diameter than the diameter of said first bore portion and smaller outside diameter than the diameter of said second bore portion so that said annular member is engageable with said first abutment, then rolling screw threads on said distal end portion of said shank to a major diameter greater than the inside diameter of said annular member and less than said diameter of said second bore portion, providing in a part an opening shorter than said collar between said exterior abutment and said opposite end, then inserting said collar through said opening in said part so as to bring said exterior abutment of said collar into engagement with a surface of said part at one end of said opening, and to extend said opposite end of said collar beyond the opposite end of said opening, and then bending said opposite end of said collar so extended outwardly over a surface of said part at said opposite end of said opening to provide a flange cooperating with said exterior abutment to hold said collar to said workpiece, whereby upon loosening of said threads on said shank from a mating workpiece said threads bear against said annular member and cause said annular member to bear against said first abutment for shifting said part away from said mating workpiece.

* * * * *